US005759042A

United States Patent [19]

Laka

[11] Patent Number: 5,759,042

[45] Date of Patent: Jun. 2, 1998

[54] METHOD OF OVERCOMING SUBSTANCE ABUSE

[76] Inventor: Eugene J. Laka, 245 E. 63rd St., Apt. 810, New York, N.Y. 10021

[21] Appl. No.: 609,463

[22] Filed: Mar. 1, 1996

[51] Int. Cl.[6] .............................. G09B 1/16; G09B 19/00

[52] U.S. Cl. ............................................ 434/236; 434/238

[58] Field of Search ..................... 40/638, 310; 434/236, 434/238, 237; 131/270

[56] References Cited

U.S. PATENT DOCUMENTS

| | | | |
|---|---|---|---|
| D. 55,985 | 8/1920 | De Richelieu . | |
| D. 262,638 | 1/1982 | Eichelberger . | |
| D. 345,992 | 4/1994 | Mohsen . | |
| 1,172,157 | 2/1916 | Melbuan | 40/638 |
| 2,682,721 | 7/1954 | Harris | 40/638 |
| 3,424,123 | 1/1969 | Giffard | 131/270 |
| 3,655,325 | 4/1972 | Toppel . | |
| 3,695,422 | 10/1972 | Tripodi . | |
| 3,925,585 | 12/1975 | Aoxagi | 40/638 |
| 4,246,913 | 1/1981 | Ogden et al. . | |
| 4,615,681 | 10/1986 | Schwarz . | |
| 4,620,555 | 11/1986 | Schwarz . | |
| 4,692,118 | 9/1987 | Mould . | |
| 4,717,343 | 1/1988 | Densky . | |
| 4,734,037 | 3/1988 | McClure | 434/236 |
| 4,877,041 | 10/1989 | Barnhouse . | |
| 4,926,573 | 5/1990 | Hetrick . | |
| 5,090,733 | 2/1992 | Bussiere . | |
| 5,207,580 | 5/1993 | Strecher . | |
| 5,217,379 | 6/1993 | Kirschenbaum et al. . | |
| 5,221,962 | 6/1993 | Backus et al. . | |
| 5,308,245 | 5/1994 | Constantino . | |
| 5,372,509 | 12/1994 | Brocato et al. | 439/236 |

*Primary Examiner*—Paul J. Hirsch
*Attorney, Agent, or Firm*—Morgan & Finnegan LLP.

[57] ABSTRACT

A method involving the application of two labels containing respective positive and negative messages to a container having an addictive substance therewithin to empower and inspire fear of the addictive substance and to encourage the substance abuser from further substance abuse. The labels may be applied by the substance abuser or by individuals associated with the substance abuser to containers of the addictive substance in the abuser's possession. Upon each use of the addictive substance, positive and negative messages are conveyed to the user to assist the user in gradually eliminating their dependence on the addictive substance.

19 Claims, 2 Drawing Sheets

Sooner or later winners quit!

*Will you?*

FIG.2

METHOD OF OVERCOMING SUBSTANCE ABUSE

BACKROUND OF THE INVENTION

1. Field Of The Invention

The invention relates generally to a method of helping substance abusers overcome their addictions and, more particularly, to the use and application of various forms of labels to containers of addictive substances to both encourage and inspire fear in a substance abuser to eradicate their substance abuse.

2. Description Of The Related Art

In the past, various attempts at eliminating abuse of addictive substances, such as cigarettes, have been made. However, such attempts have only achieved, at best, limited success.

Some attempts have focused on providing sporadic visual anti-smoking messages to the user. One such attempt is described in U.S. Pat. No. 4,926,573 to Hetrick. In this patent, a cover having an anti-smoking message for a smoking accessory, such as a socket for a vehicle cigarette lighter or an ashtray, is shown.

Other attempts have focused on actually removing cigarettes from the user's possession and substituting another device. One such attempt is described in U.S. Pat. No. 4,877,041 to Barnhouse. In Barnhouse, a cigarette substitute having the same overall dimensions as a package of cigarettes which releases a tobacco smoke aroma is shown and described. Another such attempt is shown in U.S. Pat. No. 5,308,245 to Constantino in which a kit including a resilient manually-graspable tactile grip to be squeezed by a smoker in lieu of a cigarette is shown.

Various attempts have also been made in the form of new cigarette containers. One such attempt is shown in U.S. Pat. Nos. 4,615,681 and 4,620,555 to Schwarz. In these patents, a cigarette dispenser is used to provide limited access to cigarettes contained therein. Another form of cigarette container is shown in U.S. Pat. No. 3,655,325 to Toppel. In that reference, a substitute cigarette package is used to produce simulated coughing sounds when the package is picked-up.

Other attempts have been used in which smokers are physically discouraged from smoking. In U.S. Pat. No. 4,246,913 to Ogden, a device which transmits a shock signal to the skin of a smoker is used to discourage further smoking.

Each of these aforementioned attempts, however, has serious drawbacks which greatly reduces their impact on a user's substance abuse. Previous attempts to display an informational visual anti-smoking image to a user fail to provide an enduring motivational message to a smoker to avoid further substance abuse. Previous attempts to substitute various devices for a smoker's cigarettes also have failed in their efforts to eliminate substance abuse as they require a smoker to immediately cease smoking without any psychological encouragement to do so and are particularly difficult to convince a smoker to utilize. Similarly, attempts to replace cigarette packaging with other forms of containers and attempts to electrically shock a smoker upon each use of a cigarette also fail to eliminate substance abuse in view of the likelihood that a smoker will simply avoid such packaging and such devices altogether. In particular, because all of these aforementioned attempts can be easily avoided by the substance abuser, such prior attempts have been particularly ineffective.

OBJECTS OF THE INVENTION

It is therefore an object of the present invention to provide a method for assisting individuals to overcome further substance abuse which provides both positive and negative messages to the abuser to avoid further substance abuse.

It is another object of the present invention to provide a method for assisting an individual to overcome substance abuse which is inexpensive and easy to use.

It is another object of the present invention to provide a method for assisting an individual to overcome substance abuse which is difficult for the individual to avoid.

It is another object of the present invention to provide a method for assisting an individual to overcome substance abuse which can be implemented and maintained by individuals associated with the substance abuser, even if the substance abuser is uncooperative.

It is yet another object of the present invention to provide a method for assisting an individual to overcome substance abuse which allows a gradual withdrawal from further substance abuse, and does not require an immediate cessation of the substance abuse.

It is yet another object of the present invention to provide a method for assisting an individual to overcome further substance abuse which is directed to both reason and fear.

It is yet another object of the present invention to provide a method for assisting an individual to avoid substance abuse which does not physically interfere with the individual's use of the addictive substance.

Additional objects and advantages of the present invention will be set forth in the description that follows, and, in part, will become apparent from that description. The objects and advantages realized and obtained by the present invention are particularly pointed-out in the appended claims.

SUMMARY OF THE INVENTION

In accordance with the aforementioned objects of the invention, the present invention is directed generally to a method of overcoming addictive substance abuse, comprising the steps of: creating a plurality of labels each depicting a message to empower and inhibit a substance abuser from further substance abuse; providing the plurality of labels to an individual for application to containers of the addictive substance; and affixing the labels to containers of the addictive substance in the substance abuser's possession to relay the message to the substance abuser upon each act of substance abuse. More particularly, the plurality of labels comprises a first set of labels for conveying a negative perception of the addictive substance, and a second set of labels for conveying a positive message to the substance abuser to encourage the abuser to avoid further substance abuse.

When particularly applied to eradicating an addiction to cigarette smoking, the present invention includes the steps of: permanently affixing a first type of label to one side of cigarette boxes to convey a first cumulative anti-smoking message to the smoker; permanently affixing a plurality of a second type of label to a second side of the cigarette boxes to convey a second cumulative anti-smoking message to the smoker; and repeating these steps over a plurality of weeks to provide a positive, cumulative and empowering anti-smoking message to said smoker upon each act of withdrawing a tobacco product from the plurality of packages. This method preferably does not directly intrude on the use of tobacco products by the user.

BRIEF DESCRIPTION OF THE DRAWINGS

FIG. 2 is a view of a second label in accordance with the preferred embodiment of the present invention containing a message to positively encourage a substance abuser to avoid the addictive substance within a container to which a second label is adhered.

DETAILED DESCRIPTION OF A PREFERRED EMBODIMENT OF THE PRESENT INVENTION

Figure 1:
FIG. 1 is a view of a first label in accordance with a preferred embodiment of the present invention containing a message to instill fear of the addictive substance within a container to which the first label is adhered.

With reference to the drawings, the following is a detailed description of the preferred embodiment of the present invention.

In accordance with the preferred embodiment of the present invention, the present invention is directed to a method of using a series of labels to convey various anti-substance abuse messages to a substance abuser in an effort to eradicate the substance abuse. Although the preferred embodiment of the present invention is particularly directed to eradicating addictions to cigarettes, it is to be understood that the present invention may be utilized in conjunction with addictions to other types of substances, including narcotics, alcohol as well as cigar and pipe smoking. Similarly, the present invention may also be utilized to overcome addictions to edible substances such as candies.

In accordance with this preferred embodiment of the present invention, a first type of label, as shown in FIG. 1, is used to convey a message to the substance abuser so as to instill fear of an addictive substance. In carrying out the present invention and assisting a smoker overcoming their addiction to cigarettes, an individual would apply this first type of label to cigarette packages owned by the smoker. Preferably, such a label would be applied to each cigarette container in the smoker's possession. In view of the fact that it would likely be difficult to apply such a label to each such container in the user's possession, a conscious effort is made to apply such a label to as many containers in the smoker's possession as possible.

As shown in FIG. 1, this type of label preferably contains some visual image to instill a fear of the effect of the cigarettes. In particular, the preferred embodiment of the present invention entails a skull and cross-bones design to instill a fear of death in the smoker. A series of words may also be utilized to enhance this effect on the user. In the preferred embodiment of the present invention, the term "ENJOY" is used in conjunction with the skull and cross-bones design is used to instill a fear of the cigarettes upon the smoker.

In accordance with the present invention, a second label containing a message which motivates and encourages the smoker to avoid cigarette smoking is shown. Preferably, the second type of label includes a series of words to encourage and inspire the smoker to quit further smoking. As with the first label, the second label is preferably fixed to all cigarette containers within a smoker's possession, although it is to be understood that so long as the labels are applied to as many cigarette containers as possible in the user's possession, a sufficient motivational anti-smoking message may be conveyed to the smoker to effect an eradication of further substance abuse.

It is also to be understood that although such labels may be applied by the smoker to the cigarette packages in the smoker's possession, the labels are preferably utilized by other individuals, associated with the smoker, who are interested in assisting the smoker overcome substance abuse.

Unlike previous approaches that were simply informational in nature in that they provided some informational anti-smoking message to the smoker, the present invention is directed to a motivational message conveying arrangement which is constantly presented in conjunction with the addictive substance. Such an arrangement is designed to appeal to both reason and fear in the smoker, thereby having a cumulative liberating effect on the smoker and allowing the smoker to avoid further substance abuse.

By applying the first type of label as shown in FIG. 1 to a first side of a cigarette package, a second type of label to a second side of the same cigarette package and assuring that such labels are affixed to a plurality of cigarette packages in the smoker's possession, the message to the smoker becomes inescapable and unrelenting. As such, the effect on the smoker becomes significant. Because of the various aspects of the labels which are directed to both reason and fear, the effect on the subject is both empowering and unavoidable, rather than demoralizing and easily escapable.

In particular, because the use of these labels does not directly intrude on the use of the addictive substance, a gradual withdrawal from further substance abuse may be effected. Therefore, unlike previous attempts which were directed at immediately ceasing further smoking (which most often results in only short term cessations of substance abuse), the present invention facilitates gradual withdrawal and release from further substance abuse.

In sum, the preferred embodiment of the present invention is used as follows: (1) a first type of label inspiring fear of the addictive substance in the user is permanently affixed to one side of a plurality of packages containing the abused substance; (2) a second type of label conveying a cumulative and positive anti-substance abuse message is permanently affixed to a second side of this plurality of packages; (3) the steps of applying these first and second type of labels are repeated over a plurality of weeks to provide a positive, cumulative and empowering anti-substance abuse message to the user. At no time is any of the addictive substance removed from the user's possession. As such, upon each use of the addictive substance, positive and negative messages are conveyed to the user to assist the user in gradually eliminating their dependance on the addictive substance.

Although the aforementioned preferred embodiment of the present invention has been shown and described, it is to be understood that other variations may be made in the aforementioned preferred embodiment without departing from the true nature, spirit and scope of the present invention. It is therefore intended that the scope of the present invention not be limited by the foregoing description, but is to be defined by the claims appended hereto.

What is claimed is:

1. A method of providing a strong motivational anti-smoking message to a smoker, comprising the steps of:

a. permanently affixing a first type of label to a first side of a plurality of packages containing a smoker's tobacco product to convey a first cumulative anti-smoking message to said smoker;

b. permanently affixing a plurality of a second type of label to a second side of said plurality of packages to convey a second cumulative anti-smoking message to said smoker; and c. repeating steps (a) and (b) over a plurality of weeks to provide a positive, cumulative and empowering anti-smoking message to said smoker upon each act of withdrawing a tobacco product from said plurality of packages.

2. The method of claim 1 wherein the steps of affixing said labels to said packages does not directly intrude on the use of said tobacco products by said user.

3. The method of claim 2 wherein said first type of label conveys a graphical message that inspires fear of said cigarettes in said smoker.

4. The method of claim 3 wherein said second type of label positively encourages and motivates the smoker to quit smoking in words alone.

5. The method of claim 4 wherein said first type of label comprises a skull and cross-bones arrangement.

6. The method of claim 1 wherein said smoker's tobacco product is selected from the group consisting of cigarettes, cigars and pipe tobacco.

7. The method of claim 1 wherein said tobacco product is not transferred to another package prior to said affixing steps.

8. The method of claim 1 further comprising the steps of maintaining the tobacco product in its original packaging until used by said smoker.

9. The method of claim 1 wherein said first and second types of labels are applied to all packages containing a smoker's tobacco product in said smoker's possession.

10. A method of overcoming addictive substance abuse, comprising the steps of:

a. creating a plurality of labels each depicting a message to empower and inhibit a substance abuser from further substance abuse;

b. providing said plurality of labels to an individual for application to containers of said addictive substance; and c. affixing said labels to containers of said addictive substance in the substance abuser's possession to relay said message to said substance abuser upon each act of substance abuse.

11. The method of claim 10 wherein said plurality of labels comprises a first set of labels for conveying a negative perception of said addictive substance, and a second set of labels for conveying a positive message to said substance abuser to motivate and encourage the abuser to avoid further substance abuse.

12. The method of claim 10 further comprising the step of maintaining the addictive substance product in its original packaging until used by said substance abuser.

13. The method of claim 10 wherein said labels are affixed to all containers of said addictive substance in the substance abuser's possession.

14. A method of assisting an individual from abusing an addictive substance, comprising the steps of:

providing a first message to said individual inspiring fear of said addictive substance upon handling a container of said addictive substance; and providing a second message to said individual positively encouraging the individual to quit further abuse of said addictive substance upon handling said container of said addictive substance.

15. The method of claim 14, further comprising the step of applying labels containing said first and second messages to all containers of said addictive substance in the individual's possession.

16. The method of claim 14, further comprising the step of applying labels containing said first and second messages to containers of said addictive substance utilized by the individual addicted to said addictive substance.

17. The method of claim 14, further comprising the step of avoiding physical intrusion on the use of the addictive substance by the individual.

18. The method of claim 17 further comprising the step of repeatedly applying labels containing said first and second messages to containers of said addictive substance utilized by said individual to provide an unrelenting substance avoidance message to said individual.

19. The method of claim 18, wherein said step of repeatedly applying labels is carried-out over the course of at least several weeks.

* * * * *